UNITED STATES PATENT OFFICE 2,669,554

METHOD OF TREATING CASHEW NUT SHELL LIQUID WITH FLUOBORIC ACID

Clifford F. Armitage, South Orange, N. J., assignor to Colloid Chemical Laboratories, Inc., Cedar Knolls, N. J., a corporation of New Jersey No Drawing. Application June 18, 1952, Serial No. 294,277

12 Claims. (Cl. 260—46)

This invention relates to products derived from cashew nut shell liquid and particularly to methods of treating cashew nut shell liquid to produce various products therefrom.

It is well known that cashew nut shell liquid contains large amounts of anacardic acid and that such liquids and other compositions containing anacardic acid can be treated to produce oils of varying viscosity as well as substantially rubbery or resinous materials some of which are particularly useful in the manufacture of friction materials such as brake linings and clutch facings. Heretofore, it has been common practice to treat the cashew nut shell liquid with various agents such as acids for long periods of time and at relatively high temperatures to cause the precipitation of impurities such as fibres and the like which are contained in the oil as extracted and imported from abroad. However, the amount of the reagents used and the length of time required in heating the cashew nut liquid to effect separation or precipitation of the impurities has been objectionable. Furthermore, even when purified in accordance with prior methods it has sometimes been difficult to control the reaction due to variations in the liquid as received commercially by importation from abroad.

In accordance with the present invention, a new method of treating cashew nut shell liquid and compositions containing anacardic acid has been developed whereby the purity of the treated liquid is increased and the reaction is more readily controlled. Furthermore, the treated cashew nut shell liquid produced in accordance with the present invention has numerous advantages in the production of resins and other materials from the oil in further operations.

These advantages are attained in accordance with the present invention by treating cashew nut shell liquid or other compositions containing anacardic acid with fluoboric acid.

One of the objects of the present invention is to provide a novel method for the treatment of cashew nut shell liquids and compositions containing anacardic acid.

Another object of the invention is to provide new reaction products resulting from the treatment of cashew nut shell liquid with fluoboric acid.

A further object object of the invention is to reduce the time and temperature required for the purification of commercial cashew nut shell liquid.

A further object of the invention is to effect more accurate control of the reactions resulting from the treatment of cashew nut shell liquid in the purification thereof.

These and other objects and features of the present invention will appear from the following description thereof in which reference is made to particular procedures which have been cited for the purpose of indicating the nature of the present invention and without intending to limit the scope thereof.

The cashew nut shell liquid as ordinarily imported into this country varies considerably in composition as indicated by the varying results obtained from identical treatment of the liquid with acids, polymerizing agents and similar reactants. The liquid usually contains small pieces of the nut shells and fibres as well as other impurities and when treated with acids such as sulfuric acid, for example, it is usually desirable to dilute the acid with water before addition to the liquid. The subsequent heating of the acidified liquid is prolonged due to the necessity of evaporating off the water with which the acid was diluted. During such prolonged heating the impurities such as fibres and the like are usually charred to such an extent that the resulting treated oil is relatively dark in color and the precipitated material is usually hard or gummy in consistency and is difficult to remove from the kettles in which the oil is treated.

It has now been discovered that fluoboric acid reacts in a somewhat different manner from other agents heretofore used in the treatment of cashew nut shell liquid in that the oil need not be heated to such a high temperature or for such a long period of time in order to cause separation or precipitation of the impurities. Furthermore, the precipitates formed are relatively soft and fluid so that they are easily removed from the kettle and the treated oil is lighter in color than that obtained when using other acids such as sulfuric acid. Moreover, the characteristics of the oil after treatment with fluoboric acid are more uniform despite the variations in the composition of the oil as received from abroad. It is therefore easier to control the composition and characteristics of the treated oil and to obtain more uniform reaction products by the further treatment of the oil with agents such as paraformaldehyde, hexmethylenetetramine, furfural and the like.

A very convenient form of fluoboric acid adapted for use in the practice of the present invention is that in which the acid is commercially obtainable on the market as a 43% aqueous solution. However, the concentration of fluoboric acid used in the treatment of cashew nut shell liquid and other compositions containing anacardic acid does not appear to be material. Ordinarily, the amount of fluoboric acid employed for the purification of cashew nut shell liquid need only be from about .25 to 2.5% by weight based on the weight of the cashew nut shell liquid. In using the commercial 43% aqueous solution of fluoboric acid the amount of such solution used generally varies from about ½ to 2½% based on the weight of the cashew nut shell liquid. When more than 5% of the 43% solution of fluoboric acid is used, the oil tends to thicken or to become bodied so rapidly that the separation of the impurities therefrom cannot always be effected satisfactorily. Furthermore, when the purified liquid is to be further treated for the production of resins suitable for use as friction material for brake linings and clutch facings, it is desirable to avoid undue thickening of the liquid before the addition of polymerizing agents such as paraformaldehyde, hexamethylenetetramine, furfural, phenol-formaldehyde and the like.

The temperatures to which the oil containing the fluoboric acid are heated need seldom exceed 325 to 350° F. in contrast with temperatures of 425 to 450° required for comparable reactions when using acids such as sulfuric acid, for example. Moreover, the length of time of heating when using fluoboric acid can be reduced to a minimum and, in fact, the liquid is generally well purified and the impurities precipitated by merely raising the temperature of the mixture to 325°. Prolonged heating of the mixture tends to cause thickening of the oil to a higher viscosity than is usually desirable when it is to be employed in forming resins by the action of aldehydes or other polymerizing agents. Heating for a total period of about two hours is generally sufficient and ordinarily should not exceed four hours unless heavy viscous products are desired.

It is sometimes desirable to add additional materials such as driers or stabilizers to the liquid especially when the liquid is to be treated further in the production of resinous materials. For such purposes, copper naphthenate may be added to the cashew nut shell liquid along with the fluoboric acid and prior to the heating of the mixture.

During the heating of the cashew nut shell liquid with the fluoboric acid, water contained in the liquid and added with the fluoboric acid is evaporated promptly and there may be some preliminary polymerization or condensation of constituents of the liquid as evidenced by a slight increase in viscosity. However, there is no apparent large scale polymerization or breaking down of the constituents of the liquid and as soon as the liquid has been raised to the desired temperature, the heating may be discontinued and relatively clear fluid oil may be decanted from the soft precipitated impurities. The characteristics of the oil thus obtained have been found to be more nearly uniform than are the products generally obtainable by the treatment of cashew nut shell liquid with sulfuric acid and other agents of the prior art.

In using the purified liquid obtained by treatment thereof with fluoboric acid, it is found that the reactions of the liquid in forming resins generally take place more rapidly. Thus, for example, when the fluoboric acid-treated oil is mixed with polymerizing agents such as paraformaldehyde, hexamethylenetetramine and furfural and the mixture heated, the formation of the resin takes place in approximately one-half to two-thirds of the time required for resin formation when using sulfuric acid-treated cashew nut shell liquid.

In order to indicate typical procedure in accordance with the present invention, the following examples are cited:

Example I 20 pounds of a 43% aqueous solution of fluoboric acid are added to 1500 pounds of commercial cashew nut shell liquid together with 7½ pounds of copper naphthenate. The mixture is heated in a kettle until the temperature has risen to approximately 325° which ordinarily requires a period of about two hours. Heating is then discontinued and the mixture is allowed to cool whereupon the relatively clear, honey-colored liquid is decanted leaving a soft residue of precipitated impurities in the bottom of the kettle.

The oil thus obtained has many uses in the production of resins, coating compositions, rubber additives and electrical insulators. It may be combined with other resins such as partially polymerized phenol formaldehyde resins and it may be admixed with fibres and fillers in forming molding compositions.

In producing resinous friction particles for use in brake linings, clutch facings and elsewhere, the purified oil is preferably mixed with approximately 6% by weight of paraformaldehyde and 2% by weight of hexamethylenetetramine. The mixture is then heated to a temperature of 350 to 400° F. for a period of from two to three hours while agitating the mixture or rotating the container in which the heating takes place. The resulting resinous material breaks down into a powdered or granulated product. In order to reduce the percentage of material extractable from the resins by means of acetone, the resin obtained as described above is preferably heated further for a period of four to six hours while circulating a current of air over the mixture to sweep out and carry off any volatile constituents remaining. The resulting granulated product contains less than 3% of material extractable with acetone and is adapted for use in the manufacture of brake linings and clutch facings by addition to fibrous materials and binders as in the conventional practice of manufacturing such products.

In carrying out the process of the present invention, there is no evidence of a breaking down of the fluoboric acid and it is believed that the presence of such acid in the treated oil functions as a catalyst in the further treatment of the oil with polymerizing agents such as paraformaldehyde, etc. This may further explain the reduced time and temperature required in forming resinous friction particles by the treatment of the oil with aldehydes or other polymerizing agents. However, the increased purity of the oil resulting from the treatment of cashew nut shell liquid at lower temperatures and for shorter periods of time is further believed to account for the greater uniformity of the finished resinous friction particles and the shorter time required for completing reactions of the treated liquid with polymerizing agents.

Example II 70 pounds of a 43% aqueous solution of fluoboric acid are mixed with 1500 pounds of cashew nut shell liquid and the mixture heated until its temperature has risen to approximately 350°.

Heating is then discontinued and the mixture is allowed to cool whereupon the somewhat viscous honey-colored liquid obtained is decanted from the precipitated impurities. The product obtained has the consistency of heavy molasses when cooled and is admirably suited for use as a binder in forming extruded brake lining material. In producing such products the binder is mixed with asbestos fibres and fillers together with phenolic resins in the conventional practice employed in producing extruded brake linings.

When using either of the methods described above, the resulting treated liquid is substantially uniform in composition despite the usual variations in the characteristics of the commercial liquid treated. Furthermore, the treated oil can be used in carrying out substantially any of the various methods for producing resins, plastics, paints and insulating material, by the methods heretofore used and in most cases, the presence of fluoboric acid in the treated liquid serves as a catalyst to promote the reaction whereby they may be carried out more rapidly.

While typical procedures employed in the practice of the present invention have been described above and specific products obtainable by the treatment of cashew nut shell liquid with fluoboric acid have been referred to, it should be understood that various changes and modifications may be made in the operations and conditions of treatment of cashew nut shell liquid and compositions containing anacardic acid without departing from the spirit and scope of the invention.

I claim:

1. The method which comprises mixing from about 0.25 to 2.50% by weight of fluoboric acid in aqueous solution with cashew nut shell liquid and heating the mixture.

2. The method which comprises mixing from about 0.25 to 2.50% by weight of fluoboric acid in aqueous solution with cashew nut shell liquid and heating the mixture to a temperature of about 325° F. to 350° F.

3. The method which comprises mixing from about 0.25 to 2.50% by weight of fluoboric acid in aqueous solution with cashew nut shell liquid and heating the mixture to a temperature of about 325° F. to 350° F. for a period not exceeding about four hours.

4. The method which comprises mixing from about 0.25 to 2.50% by weight of fluoboric acid in aqueous solution with cashew nut shell liquid and heating the mixture and about 0.5% by weight of copper naphthenate.

5. The method which comprises mixing from about 0.5 to 4% by weight of a 43% aqueous solution of fluoboric acid with cashew nut shell liquid and heating the mixture.

6. The method which comprises mixing from about 0.5 to 4% by weight of a 43% aqueous solution of fluoboric acid with cashew nut shell liquid and heating the mixture to a temperature of about 325° F. to 350° F.

7. The method which comprises mixing from about 0.5 to 4% by weight of a 43% aqueous solution of fluoboric acid with cashew nut shell liquid and heating the mixture to a temperature of about 325° F. to 350° F. for a period not exceeding about four hours.

8. The method which comprises mixing from about 0.5 to 4% by weight of a 43% aqueous solution of fluoboric acid with cashew nut shell liquid and heating the mixture and about 0.5% by weight of copper naphthenate for a period not exceeding about four hours.

9. The method which comprises mixing from about 0.25 to 2.50% by weight of fluoboric acid in aqueous solution with cashew nut shell liquid and heating the mixture, separating the resulting treated oil from any precipitate formed, adding hexamethylenetetramine and an aldehyde to said oil and heating the mixture thus produced.

10. The method which comprises mixing from about 0.25 to 2.50% by weight of fluoboric acid in aqueous solution with cashew nut shell liquid and heating the mixture, separating the resulting treated oil from any precipitate formed, adding hexamethylenetetramine and an aldehyde to said oil and heating the mixture thus produced to a temperature of about 400° F.

11. The method which comprises mixing from about 0.25 to 2.50% by weight of fluoboric acid in aqueous solution with cashew nut shell liquid and heating the mixture, separating the resulting treated oil from any precipitate formed, adding hexamethylenetetramine and an aldehyde to said oil and heating the mixture thus produced to a temperature of about 400° F. for a period of from two to three hours.

12. The method which comprises mixing from about 0.25 to 2.50% by weight of fluoboric acid in aqueous solution with cashew nut shell liquid and heating the mixture, separating the resulting treated oil from any precipitate formed, adding hexamethylenetetramine and an aldehyde to said oil and heating the mixture thus produced, and thereafter continuing heating of the mixture while circulating air thereover for a period of several hours until less than 3% of the reaction product is extractable with acetone.

CLIFFORD F. ARMITAGE.

References Cited in the file of this patent

UNITED STATES PATENTS

| Number | Name | Date |
| --- | --- | --- |
| 1,821,095 | Harvey | Sept. 1, 1931 |
| 2,142,980 | Heiyser | Jan. 3, 1939 |
| 2,317,586 | Caplan | Apr. 27, 1943 |
| 2,592,588 | Nemir | Apr. 15, 1952 |